United States Patent [19]

vom Braucke et al.

[11] Patent Number: 5,529,323
[45] Date of Patent: Jun. 25, 1996

[54] HAND-PULLED WAGON HAVING REMOVABLE FRONT, SIDE AND REAR WALLS

[75] Inventors: Hans vom Braucke, Vlotho; Manfred vom Braucke; Dieter Westerwelle, both of Bielefeld, all of Germany

[73] Assignee: Bielefelder Küchenmaschinen- und Transportgeräte-Fabrik vom Braucke GmbH, Bielefeld, Germany

[21] Appl. No.: 311,732

[22] Filed: Sep. 23, 1994

[30] Foreign Application Priority Data

Sep. 27, 1993 [DE] Germany .............................. 9314501 U
Sep. 27, 1993 [DE] Germany .............................. 9314502 U
May 10, 1994 [DE] Germany .............................. 9407716 U

[51] Int. Cl.⁶ ..................................................... B62B 3/02
[52] U.S. Cl. ................................. 280/87.01; 280/47.34; 301/112; 301/122; 16/111 R
[58] Field of Search ............................. 280/87.01, 47.34, 280/47.35, 79.2, 47.18, 87.05, 47.36, 74.371; 296/43; 16/124, 111 R; 301/111, 112, 114, 122, 125, 131

[56] References Cited

U.S. PATENT DOCUMENTS

| | | | |
|---|---|---|---|
| 2,729,196 | 1/1956 | Breitenbach | 296/43 |
| 3,220,773 | 11/1965 | Burns | 280/79.2 |
| 3,809,435 | 5/1974 | Morris | 301/112 |
| 4,244,593 | 1/1981 | Malone | 280/87.01 |
| 5,171,068 | 12/1992 | Wu | 301/114 |
| 5,358,314 | 10/1994 | Spadotto | 301/111 |
| 5,449,224 | 9/1995 | Johnson | 280/47.34 |

FOREIGN PATENT DOCUMENTS

3631998 3/1988 Germany .............................. 280/47.34

*Primary Examiner*—Margaret A. Focarino
*Assistant Examiner*—Min Yu
*Attorney, Agent, or Firm*—Burns, Doane, Swecker & Mathis

[57] ABSTRACT

A hand-pulled wagon comprises a horizontal bed supported on a frame to which are attached ground support wheels. The axles of the wheels are attached to sleeves which extend downwardly from the frame. Upper ends of the sleeves are hollow to receive mounting posts affixed to removable side walls. The sleeves extend upwardly no higher than the bed, so that when the side walls are removed, access to the bed is not obstructed by the sleeves. A manual pull rod is attached to the wagon and includes a generally arrow-shaped pull handle designed to minimize discomfort to the user while pulling the wagon.

27 Claims, 12 Drawing Sheets

HAND-PULLED WAGON HAVING REMOVABLE FRONT, SIDE AND REAR WALLS

BACKGROUND OF THE INVENTION

The invention relates to a hand-pulled wagon, especially a hand-pulled wagon having a horizontal bed and removable vertical side and end walls which project upwardly beyond the bed, and a rectangular closed frame, made especially of tubes, is provided as the support for the bed. Under a rear end of the bed there is a rear axle and under a front end of the bed there is a front axle. The front axle carries a center pole and can be swivelled in a centered, vertical journal.

Hand wagons have existed for a long time in the wheelwright technology; but as hand wagons with rubber tires they have also existed as Weser toy wagons since at least 1970, whereby the prior art hand wagons of the wheelwright technology were provided, first of all, with closed side walls and secondly with rubber tired wheels. Furthermore, the hand platform trucks 2101 of the company Gebr. v. Braucke-Handwagen, which have existed since the 1950's, are known as conveyances, where the supporting frame was designed as a rectangular frame, which was made in particular of steel tubing and which was braced against the rear axle with V-shaped supports and the front axle was connected to the frame via a rider. Another hand wagon of this class that corresponds to the state of the art is known from the DE-PS 36 31 998. In the case of this hand wagon, the frame is supported by two U-shaped parts with horizonal legs, which are welded in the central region of their height to the longer sides of the rectangular frame made of tubes. At the same time especially, the front and rear side supports project upwardly significantly beyond the plane of the rectangular frame made of tubes, on which the plank bed is laid. These supports are troublesome not only when transporting such a hand wagon in the trunk of a passenger car, since they are quite bulky, but they are also troublesome when transporting objects, which project beyond the area of the plank bed. Thus, the possibility of using the hand wagon according to the DE-PS 36 31 998 to transport bulky objects is limited; and secondly it is difficult to transport the hand wagon in a motor vehicle.

SUMMARY OF THE INVENTION

Therefore, the invention is based on the problem of designing a hand wagon in such a manner that it is much simpler to manipulate with respect to transportability, in particular while carried in motor vehicles, and whereby the hand wagon enables the transport of bulky goods.

This problem is now solved according to the preferred embodiment of the invention wherein the frame is connected to the rear axle via supports, mounted directly on or attached directly to the rear axle, and is connected to the front axle via L-shaped supports, whereby the supports are attached to the inside of the frame and project therebeyond by an amount equal to the thickness of this bed so that the supports meet flush with the plank bed laid on the frame. The supports are designed at least in a vertical region thereof as tubes with insert openings for receiving inserts provided on the side walls, and whereby means for securing the removable walls are provided. Thus, the hand wagon can be used either as a platform truck (without upright walls) or a box wagon (with upright walls). The goal is reached, that especially bulky goods which project beyond the loading area, can be readily transported after the front wall and rear wall and the side walls have been removed, since there are no disturbing side supports needed to receive the side walls. Since the side supports are missing, the frame can be built significantly lower then the frame known according to the state of the art, so that the manipulability of this hand wagon in trunks of motor vehicles has been significantly simplified, since the bulky supports no longer block uselessly the loading space. The hand wagon can now be laid or slid into the trunk with the platform bed tipped up.

The rear supports are designed in an advantageous manner as straight tubes, which are braced immediately against the rear axle. In so doing, profile sections can be used that need only be cut to length. At the same time the rear supports exhibit in an expedient manner a rectangular profile and the front supports exhibit a round profile. Owing to these different shapes of the front and rear supports the goal is reached that a strip or area can be welded especially for the purpose of attaching the rear axle flexibly to the rectangular tube frame. So that the mounted side walls are slipped into their respective side position, the side walls exhibit external insert elements, which can be slipped into the insert openings of the angled supports. At the same time the insert element assigned to the rear axle exhibits correspondingly a rectangular shape; and the insert element of the side wall assigned to the front axle exhibits a tubular shape. For better threading of the insert elements on the side walls, the invention provides tapering insert elements, thus resulting in a clamping since the taper cone is pressed into the supports.

Both the supports provided for receiving the side walls and the insert elements provided on the side walls exhibit in an advantageous manner side openings, which communicate in pairs and can be inserted into the safety bolts, whereby preferably the safety bolts are provided with security means. A slide lock-like insert safety or an open lock washer, which envelops partially the supports, is provided in an advantageous manner as the security means.

In another embodiment both the supports provided for receiving the side walls and also the insert elements provided on the side walls exhibit side openings, which communicate in pairs and can be inserted into the safety bolts. The safety bolts are provided in an advantageous manner with security means. Due to these insertable safeties, the side walls can be easily secured, a feature that is also simple and economical.

A slide lock-like insert safety is provided as the security means. After the cotter pin has been inserted, a cotter pin is rotated by an angle corresponding to the slide and is prevented thus from being unlocked unintentionally. To unlock, the cotter pin is rotated in the opposite direction of the locking direction and thus released from the slide; then the cotter pin can be removed. As an alternative an open lock washer, which partially envelops the supports, is provided as the security means. This lock washer is inserted for the purpose of locking; this lock washer is attached in an advantageous manner to the support with a chain so as to be undetachable.

In a preferred embodiment the supports provided for receiving the side walls exhibit side openings; and the insert elements provided on the side walls exhibit corresponding noses. With this design the goal is reached that, when the side walls are inserted, the noses are snapped into the openings and lock. Removal of the side walls requires an unlocking, which is achieved from the outside by twisting the side walls or by pushing back the noses. This type of safety is independent of the cross-sectional shape of the support or insert element. Both these side openings and the noses are aligned advantageously with the longitudinal center plane of the hand wagon, whereby they exhibit preferably an undercut which reaches below the upper edge of the openings. With this design the goal is reached that the inserted insert elements are pushed toward the outside owing to their own weight, virtually self-locking, whereby their inwardly pointing noses reach under the bottom end of the receptacle, thus preventing them from being pulled out. This state is reinforced by the externally oriented effect of the inserted front and rear wall. To remove the side walls, therefore, the front and rear wall must first be removed, then the side walls are pressed inwardly and pulled; this pressing releases the locking noses; and the side walls can be pulled out in an easy manner. Owing to the provided undercut, the locking is not released when the side wall is lifted up; rather the nose has to be pushed back from the outside in order to unlock. Thus, the nose opening can be covered from the outside with a shutter, which prevents an unintentional unlocking, since it has to be removed first prior to unlocking. The insertable ends of the insert elements are formed preferably by slots so as to be flexibly resilient, whereby the slots are extended advantageously at least as far as level with the noses and are oriented at right angles to their axis.

To also secure the front wall and rear wall, the receiving rails, into which these walls are inserted, are provided with head pieces, which reach over the inserted front and rear wall and fix them into position once they have been inserted. In so doing, the wedge-shaped shape of these walls enables a simple insertion operation, since the bottom part of the walls can be moved without force between the insert rails; and the side walls do not have to be pushed outwardly until the last member of these walls is slid in. Thus, the front and rear walls have so much play in the insert elements that the upper edges of these walls can be pushed below the head pieces of the insert rails. To remove these walls, the procedure is reversed. First, the side walls are pressed outwardly, so that the upper edges of the front or rear wall are free of the bead pieces of the insert rails and thus can be lifted out.

According to an especially advantageous embodiment of the invention, the side edges of the front and rear wall, which can be inserted into mounted strips on the inside at the grooves forming the side walls, extend for the purpose of closing the box on the plank rest at an angle, which is slightly greater than the angle, at which the supports are arranged at the rectangular tube frame for receiving the insert elements of the side walls. Owing to this different shape of the angles relative to the supports and the building components of the wagon, the goal is reached that the front and rear sides push the side parts slightly toward the outside, so that the construction kit rests on the rectangular tube frame subject to slight stress. The stress on the box prevents in particular the development of noise when the wagon is pulled over uneven terrain.

To mount the wheels advantageously, plastic bearing brackets, which are provided with locking means that guarantee that the position of the locking means will not rotate on the axle, are slid on the axle journals, instead of the end plates defining the axial motion. These bearing brackets consist of a hollow cylinder, which is slid without significant play over the respective axle journal, so that its projecting part receives the hub of the wheel. The locking means, which either consist of a nose resting against the mounting for the axle or are provided with a plug-shaped extension for the purpose of inserting into the ends of the tubes bent over by about 90° and forming the center pole bearing, are molded to the outer wall of the hollow cylinder. It is self-evident that these attachments can also exhibit the shape of sleeves, for the purpose of receiving these tube ends. The manufacture is significantly simplified by means of these bearing brackets, since the time-consuming welding of the end plates is dispensed with by sliding on the bearing brackets.

In another embodiment the mounting element is designed advantageously as a one-piece molding, whereby the molding consists of a spreading element, to whose front side a flatly arched cap is attached for mounting the running wheel on the axle or for covering the tube opening and which can be inserted into the tube opening of the axle. With this design of such a mounting element the goal is reached that the tube no longer protrudes beyond the plane of the running wheel, since the flatly arched cap lies in the plane of the running wheel. This cap at the front side of the spreading element can even lie offset in the running wheel's plane of span, so that there are no longer any points of engagement or troublesome attachments on the axle with respect to the flatly arched cap surface in the axial region that can prevent the maneuverability of the hand wagon or cart and can result in the risk of injury when transporting such a hand wagon or such a cart.

According to an advantageous embodiment of the invention, the spreading element can be spread against the inner wall of the axial tube by means of a clamping element. Moving the attachment or bracing of the mounting element into the axial tube has the advantage that the mounting forces no longer have to be applied externally to the running wheel. In addition, the molding exhibits an axial borehole, in which the clamping element is arranged relative to the radial compression of the spreading element. In an advantageous manner the clamping element is designed as a tightening screw or clamping element; at the same time expansion dowels are inserted. In particular clamping wedges are advantageous in the embodiment, if the clamping wedge can be slid over an eccentric gearing mounted in the cap for the purpose of transferring the expansion forces of the spreading element in the borehole. In so doing, to form the eccentric gearing relative to the wedge tip, a bolt is attached that is positioned eccentricly in a sleeve that can be swivelled by means of a lever. The design of the holding element by means of a clamping wedge, which can be braced via an eccentric gearing, has the advantage that the running wheel can be mounted and unmounted simply and rapidly. In so doing, only the rocking lever mounted in the cap has to be shifted in order to release the mounting element either from the axial tube or to brace the mounting element in the axial tube.

In an expedient embodiment the spreading element exhibits radial grooves with slotted openings arranged in the bottom region. Owing to this arrangement the spreading element can be braced radially point-by-point against the inner wall of the axial tube. Providing additional slotted openings, especially in the bottom region, makes it easier to generate the clamping forces with the clamping elements.

In another especially advantageous embodiment the cap exhibits on the inside a circumferential groove, which corresponds to the wall thickness of the tube-shaped axle. When the mounting element is put on the tube end, in particular the front side of the tube wall presses into the embedded circumferential groove of the cap, so that the flatly arched cap hardly projects beyond the end tube. On the outside of the spreading elements locking nubs, engaging in corresponding recesses in the axial tube, can also be used as additional safeties against the removal of the wheels.

At the same time according to an especially advantageous embodiment of the invention, the molding formed by spreading element and cap is made of an injection molded part, which also allows the spreading element to be deformed as required for the bracing.

According to an advantageous embodiment of the invention, the mounting of the front axle envelops a vertical bearing tube, which receives a journal and which is attached in the center of a leg connecting the front, angled supports. The mounting of the front axle can envelop a vertical tube, with which the journal of the front axle engages. In so doing, the mounting of the front axle is on a longer section, corresponding to the length of the bearing tube, so that the front axle is well braced against tilting stresses in vertical planes. At the same time, the bearing tube itself is attached in the center of the leg connecting the front angled supports. The bearing tube itself can also be attached, by means of a weld connection, in the center between a divided leg. The mounting of the rear axle is designed in such a manner that the rear supports are attached directly on or to the rear axle.

In another advantageous design the pivot bearing for the center pole is formed by means of a bearing tube, which receives with play the journal, which is connected to the pole receptacle and into which plastic fitting inserts, which position the journal, are inserted at least at one end, preferably at both ends. To facilitate the rotation of the front axle with the center pole, the journal has a spacing sleeve, whose sleeve body enveloping the journal shape-lockingly, rests with its one end against the face of the bottom one of the bearing brackets, so that there is less bearing friction and greater ease of motion, whereby with a suitable choice of plastic the wear is also decreased. To prevent the spacing sleeve from rotating relative to the journal, the sleeve body is provided with a collar-like extension, which rests on one side or both sides against the front axle.

According to another problem of the invention, it is provided that, compared to a right angle attachment of the handle bars on the pull rod of a center pole, as known from the state of the art, the handle bars are attached ergonomically better to the pull rod of the center pole, in order to eliminate in this manner the dragging pull forces in the arm that are generated when pulling such a hand wagon. The center pole, with which this hand wagon is pulled, exhibits at the free end of the pull rod angled handle bars, which are mounted on the pull rod and which with respect to their angular positions relative to the pull rod of the center pole correspond somewhat to the unloaded hand position of a human. Due to the ergonomically better design of the handle bars the goal is reached that the hand wagon can be pulled by a person, whose wrist does not have to be held either rotated or at an angle when pulling the hand wagon, so that the pull force corresponding to the natural position of the arm is introduced into the shoulder and dragging torsional forces are eliminated when pulling the hand wagon. In order to transfer the pull force in an ergonomically better manner, the handle bars are at an angle; the ends of the handle bars lie above the pull rod and the handle bars form with the pull rod in the vertical plane due to the center pole an angle, which ranges from 2' to 10'; in a plane lying at right angles thereto, the handle bars form with the draw rod an angle of less than 90', whereby the angular range of 85' to 65' is preferred; the handle bars form a profile pointing in the direction of pull. Such a spatial angling of the handle bars prevents the wrist joint, forearm joint and elbow joint from becoming cramped and facilitates pulling. For a better grip on the handle bars, gripping elements that fit and are correspondingly haptically pleasant to the palms are slid on the handle bars.

BRIEF DESCRIPTION OF THE DRAWINGS

The essence of the invention is described in detail with the aid of the embodiments shown in FIGS. 1 to 24:

FIG. 4b is a top plan view of the wagon of FIG. 4a;

DETAILED DESCRIPTION OF PREFERRED EMBODIMENTS OF THE INVENTION

Figure 1:
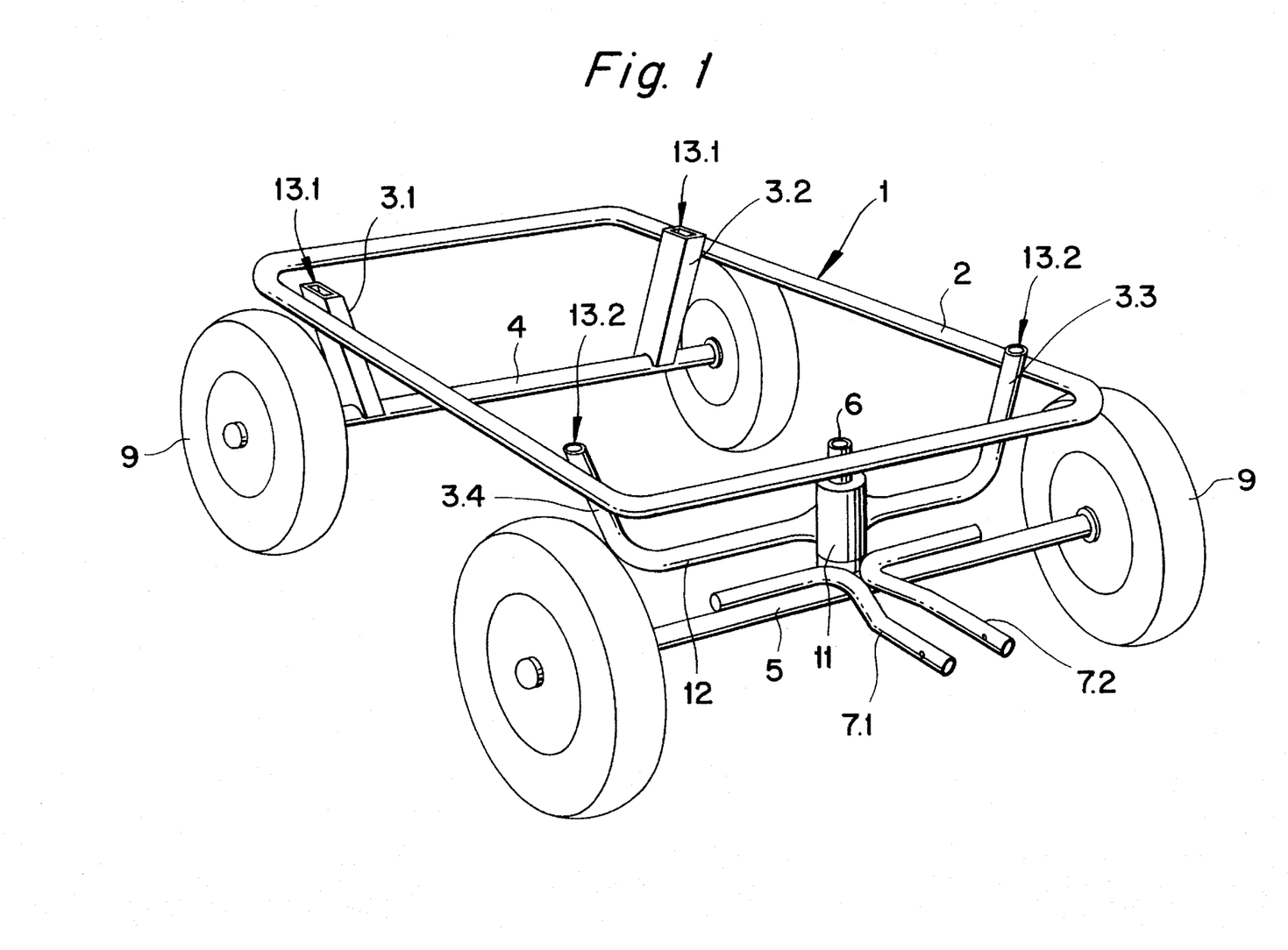
FIG. 1 is a front perspective view of a hand-pulled wagon according to the invention with a superstructure being omitted.

A manually portable hand wagon 1 comprises a rectangular tubular frame 2, which extends in a horizontal plane with the longer sides disposed in the hand wagon's direction of travel, and which exhibits rounded edges and attached supports 3.1, 3.2, 3.3 and 3.4. A rear axle 4 is attached below the rear end region of the rectangular tubular frame 2, and a front axle 5 is pivot-mounted in the front region of the rectangular frame 2. The front axle 5 is pivot-mounted approximately at its center around a vertical journal 6. Tubular pieces 7.1 and 7.2, which are bent at about right angles, are attached to the front axle 5, whereby one of the legs of the tubular pieces 7.1 and 7.2 is welded to the front axle 5; and the free standing leg sections of the tubular pieces 7.1 and 7.2 form a bearing point in the direction of travel of the hand wagon 1 to receive a pull rod 19 of a center pole 8 (see FIG. 2).

Ground support wheels 9 are mounted on the ends of the two axles 4 and 5. To connect the rectangular tubular frame 2 to the rear axle 4 and the front axle 5, the supports 3.1, 3.2, 3.3, and 3.4 are welded to the inside of the frame 2 and extend at an angular tilt relative to the tubular frame 2, i.e., downwardly and inwardly. The supports 3.1, 3.2, 3.3 and 3.4 are attached in such a manner that a vertical end region of the supports 3.1, 3.2, 3.3 and 3.4 projects slightly upwardly beyond the rectangular tubular frame 2. The amount by which the support extends above the frame corresponds to about the thickness of a plank bed 10 resting on the rectangular tubular frame 2, as shown especially in FIG. 2.

Figure 2:
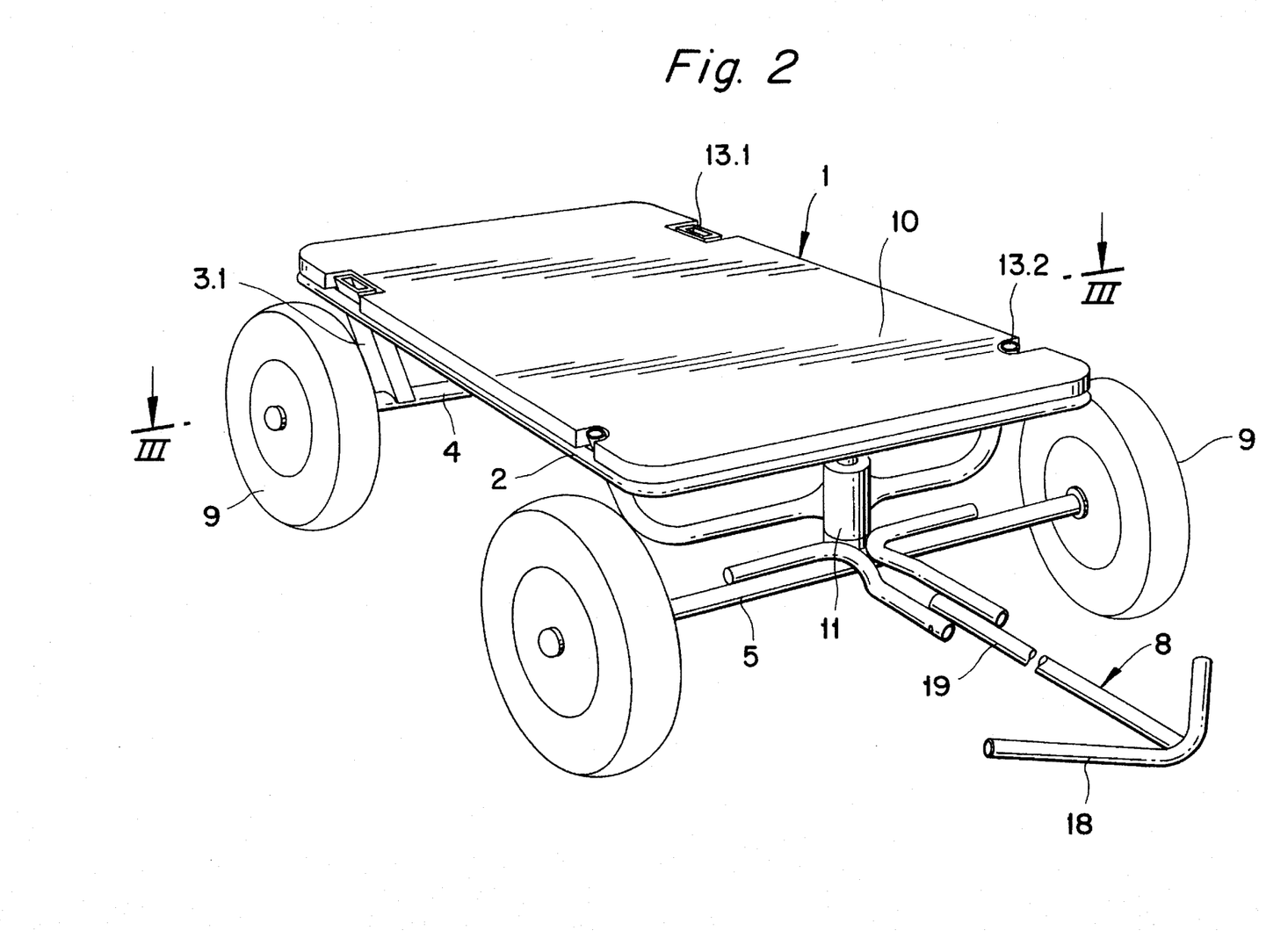
FIG. 2 is another perspective view of the hand-pulled wagon with a bed mounted thereon.

The mounting for the front axle 5 comprises a bearing tube 11, which receives the journal 6 and which is attached so as to be centered on a leg 12 interconnecting the front angled supports 3.3 and 3.4. The connecting leg 12 can comprise two pieces, with each piece welded rigidly to the bearing tube. To mount the rear axle 4, the rear supports 3.1 and 3.2 are attached directly on or to the rear axle 4. The rear supports 3.1 and 3.2 exhibit a rectangular cross-section, whereas the front supports 3.3 and 3.4 have a round cross-section. The supports 3.1, 3.2, 3.3 and 3.4 are hollow so as to form insert openings 13.1 and 13.2 for the purpose of receiving external insert elements 14, 14' which are attached to side walls 15 of a box to be constructed. The insert elements 14 assigned to the rear axle 4, are designed correspondingly as a rectangular shape; and the insert elements 14' assigned to the front axle 5 are designed correspondingly as a round profile. To be able to insert the insert elements 14, 14' into the respective supports with greater ease and simplicity, the insert elements are designed in particular like a wedge or cone.

Figure 3:
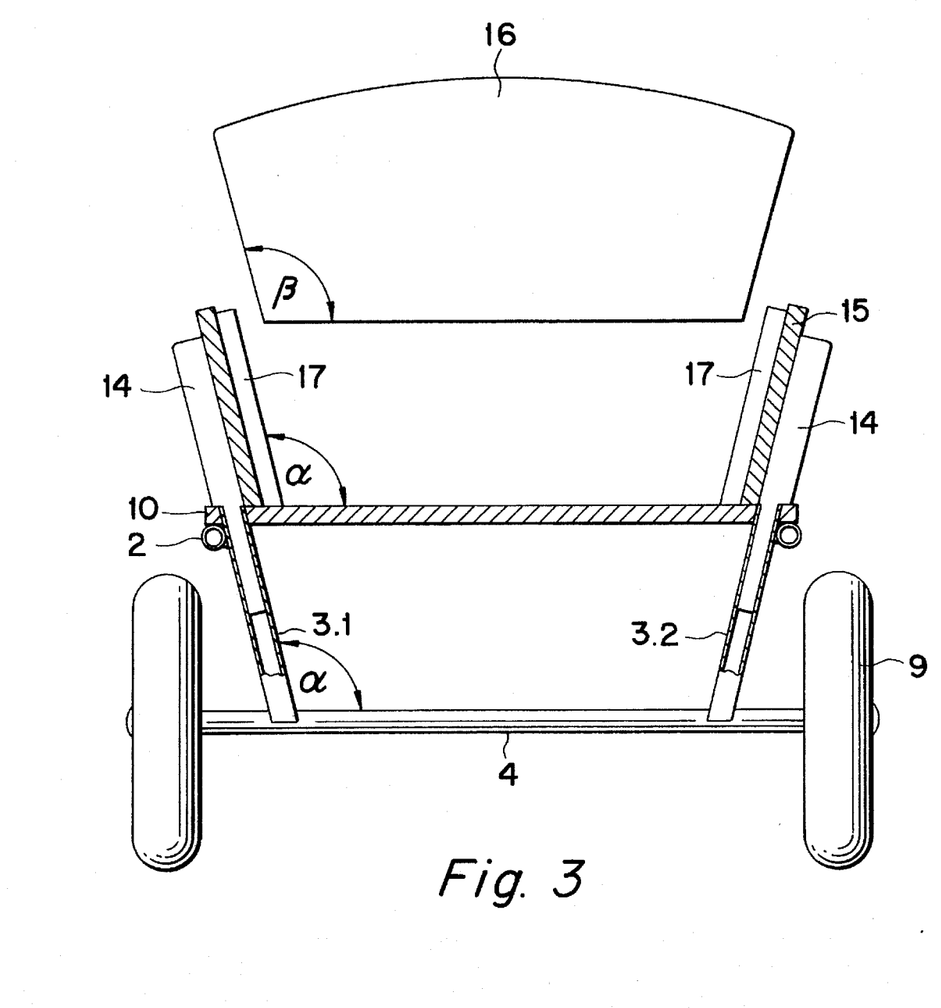
FIG. 3 is a partial sectional view of the hand wagon with constructed box along the line III—III in FIG. 2.

As is evident from FIG. 3, the insert elements 14 (attached to the respective side walls 15) engage within the insert openings of supports 13.1 and 13.2 of the bed 10, which openings lie in a common horizontal plane. The side walls 15 extend upwardly and outwardly at a predetermined angle which is smaller than that of the front and rear walls 16, 16' for the purpose of forming the box on the bed 10. That is, angle β in FIG. 3 is greater than angle α. The front and rear walls 16, 16' are inserted in a known manner into slotted strips 17 formed on the inside of the grooves forming the side walls 15. Owing to the different angular shapes of the front and rear walls 16, 16' relative to the angles of the supports 3.1, 3.2, 3.3 and 3.4, the goal is reached that the box mounted on the bed 10 is mounted subject to mild or small pre-stress. For better transport, but also for storage, the hand wagon 1 can be disassembled in a simple manner. First, the front and rear walls 16, 16' are pulled out; and then the side walls can be pulled out of the supports 3.1, 3.2, 3.3 and 3.4. The side walls 15 can be stored, for example, under the bed 10 by being supported on the rear axle 4 and the connecting leg 12, so that the side walls 15 can remain with the wagon during the transport of bulky goods. In addition, the front and rear walls 16 can be stored in the same manner below the bed 10.

Figure 4A:
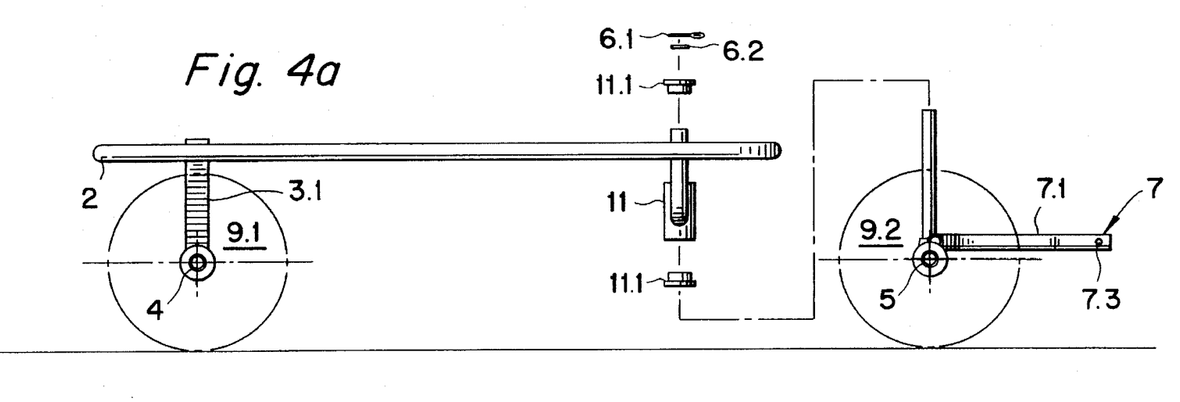
FIG. 4a is a schematic side elevational view of the hand wagon without the bed and upright walls.
Figure 4B:
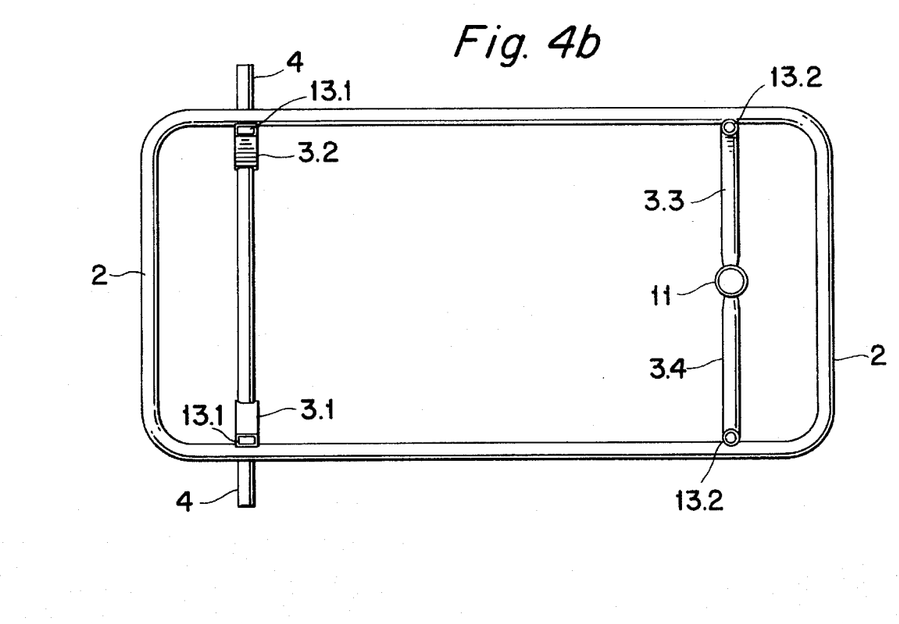
Figure 4C:
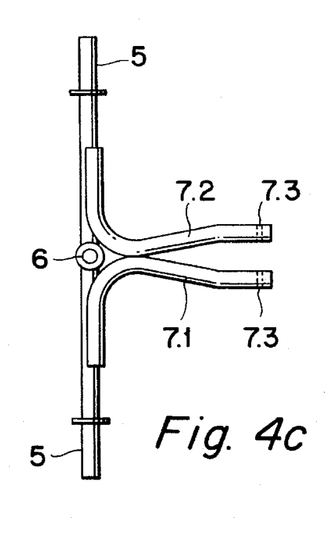
FIG. 4c is a top plan view of a front axle.

FIGS. 4a and 4b are a schematic top view and a side view, respectively, of the hand wagon, wherein the bed 10 and the side walls 15, front wall 16 and rear wall 16' are omitted for the sake of a better overview. The circumferential rectangular base frame 2, which supports the bed, is provided with the supports 3.1, 3.2, 3.3 and 3.4, which extend at right angles to the base frame 2 when viewed in FIG. 4a and the first two supports of which support the rear axle 4, and the last two supports support the bearing sleeve 11, into which the journal 6 of the front axle 5 is inserted (shown apart here). The journal 6 is guided and positioned by the fitting inserts 11.1. In addition, the bearing sleeve 11 is formed advantageously of a tubular piece, in which the journal 6 exhibits adequate play. Disposed at both ends of the bearing sleeve 11 are fitting inserts 11.1, which receive the journal 6 and position the journal by enveloping it. The journal is prevented from falling out of the sleeve 11 by a pin 6.1 which extends through the journal (see FIG. 13). A washer or disk 6.1 is positioned to prevent direct contact between the pin 6.1 and upper fitting insert 11.1. The front axle 5, at whose center the journal 6 is disposed, is provided with mounted supports defined by the pipe pieces 7.1 and 7.2, which are bent by approximately 90° (see FIG. 4b) to form a fork-like connector 7 for the reception of the pull rod 19, which is hinged to the connector 7 by means of a bolt guided through a borehole 7.3. The supports 3.1 and 3.2 are designed as upright rectangular tubes; and the supports 3.3 and 3.4 are designed as upwardly bent round tubes, so that the free ends thereof protrude at a steep angle. The upper ends of the supports are open and form the insert openings 13.1 or 13.2 for the insert elements 14, 14' of the side walls 15.

Figure 5:
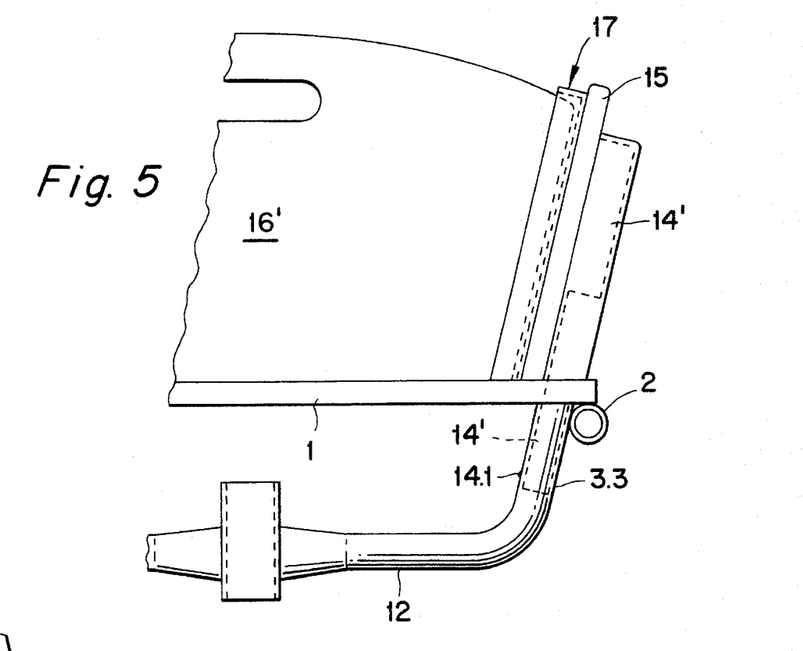
FIG. 5 is a partial front view of the hand wagon with an inserted side and front wall.
Figure 6:
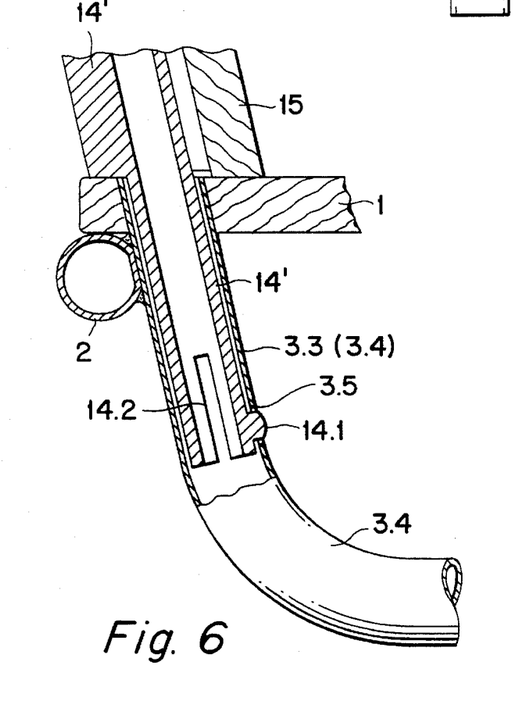
FIG. 6 is a sectional view of a detail of a front support sleeve.
Figure 7:
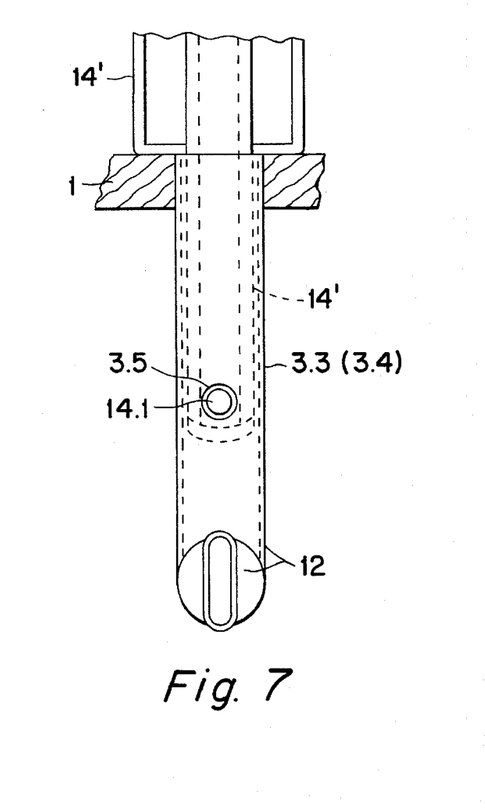
FIG. 7 is a side elevational view of the front support sleeve.

FIGS. 5 to 7 show the front end of the hand wagon according to the invention, whereby the front axle with wheels and center pole are not illustrated in detail for the sake of simplicity. The bed 1 is supported by the rectangular frame 2, to which the leg 12 is attached on both sides. The center of the leg carries the vertical bearing tube 11 for the journal (not illustrated in detail) of the front axle (also not illustrated in detail). The upwardly bent sections of the leg 12 form the insert supports (sleeves) 3.3., into whose openings the insert elements 14' of both side walls 15 are inserted. Both side walls in turn exhibit slotted strips 17, into which the front wall 16' is put. As evident from FIGS. 2 and 3, the lower free ends of the insert elements 14' have a radial snap-in nose 14.1, which faces the inside of the hand wagon and engages with holes 3.5 provided in the insert sleeves 3.3. For better handling, the insert elements 14' exhibit axial slots 14.2 in the region of the nose, which impart to the elements 14' a certain resilience, so that snapping-in of the noses 14.1 into the openings 3.5 is facilitated. The insert elements 14' exhibit with respect to the insert sleeves 3.3 a certain play, so that the side walls 15 can be pushed inwardly (i.e., against the forces acting during the loading process), until the noses 14.1 are free to thus aid in the unlocking procedure. When the carried load is pushing the side walls outwardly, the nose 14.1 cannot become accidentally unlocked.

Figure 7A:
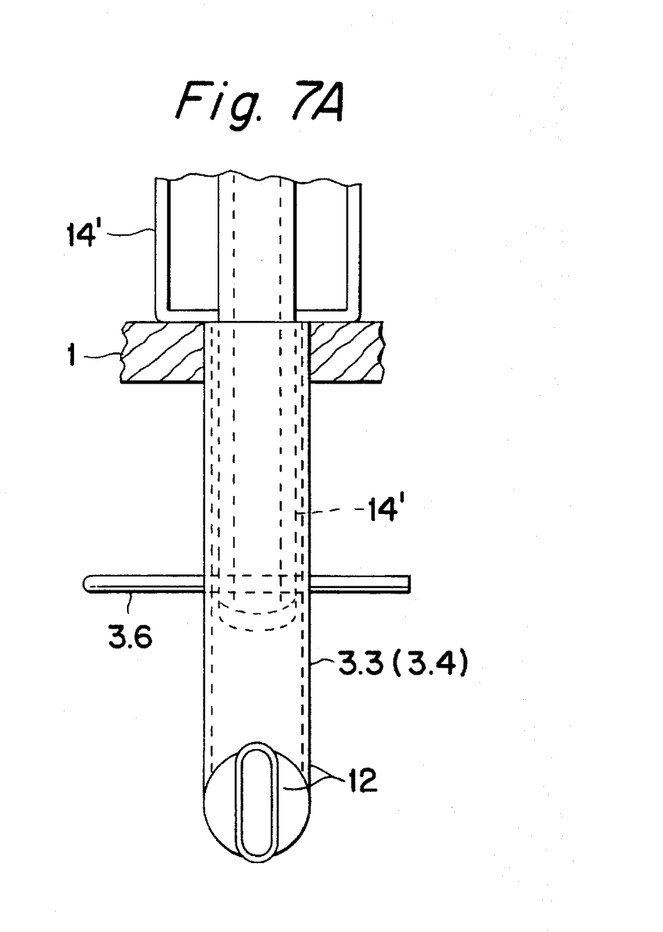
FIG. 7A is a view similar to FIG. 7 of an alternate means for locking a side wall to a support member.
Figure 7B:
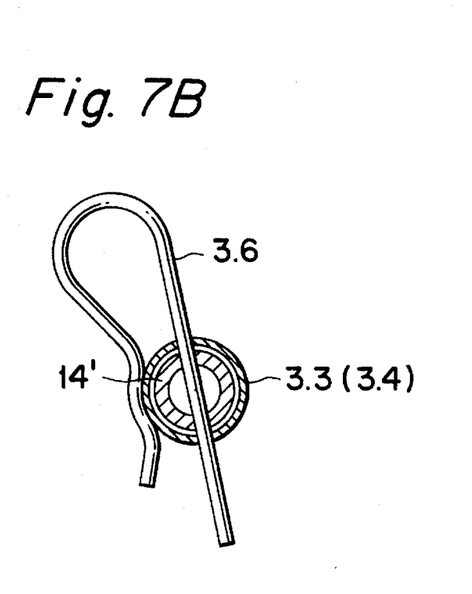
FIG. 7B is a sectional view of the locking means of FIG. 7A.

Instead of nose 14.1, a cotter pin 3.6 can be employed to lock the insert element 14 to the sleeve, as depicted in FIGS. 7A, 7B.

Figures 8, 9, 10:
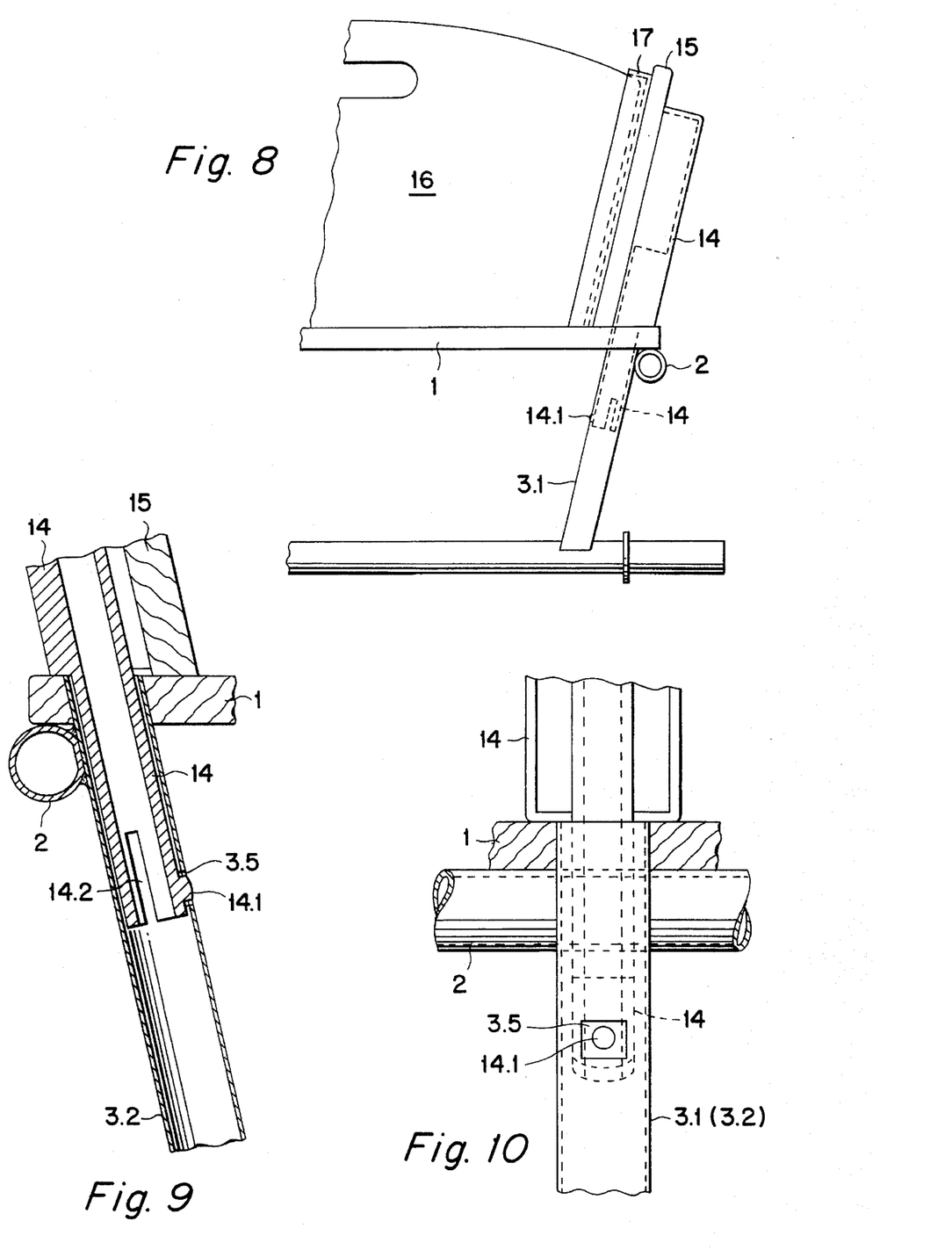
FIG. 8 is a partial rear view of the hand wagon with an inserted side wall and a rear wall.
FIG. 9 is a sectional view of a rear support sleeve.
FIG. 10 is a side view of the rear support sleeve of FIG. 9.
Figure 11:
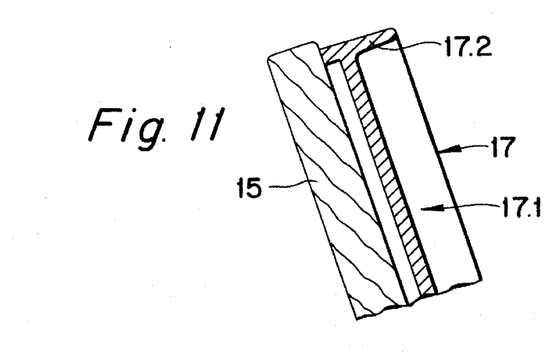
FIG. 11 is a sectional view of a detail of a slot for receiving front or rear walls.
Figure 12:
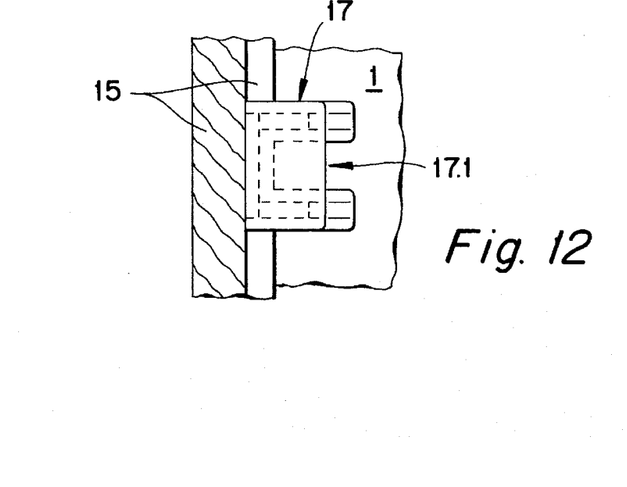
FIG. 12 is a top view of FIG. 12.

FIGS. 8 to 10 show the same relationship for the rear side. Here the circumferential, rectangular frame 2 of the hand wagon 1 is depicted; the hand wagon 1 is provided with insert supports (sleeves) 3.1, into which the insert elements 14 of the side walls 15.1 and 15.2 are inserted. These insert elements 14 are also equipped with inwardly facing noses 14.1, as described above, which snap into openings 3.5 of the insert sleeves 3.1 that face the center plane of the hand wagon 1. To guarantee an elastic resilience, the insert elements 14 are provided with slots 14.2, which are oriented at right angles to the axial direction of the noses 14.1 and which extend at least as far as level with these noses 14.1. As in the case of the region of the front side, the side walls 15 are provided with a slot-forming strip 17 forming slots 17.1 (see FIG. 11), into which the rear wall 16 is inserted. Since the side walls 15 slope outwardly and the front and rear walls exhibit side edges adapted to this slope, the insertion is extremely simple, since the front and rear walls do not tightly engage with these slots 17.1 until the very last moment of insertion. The outer edges of the front and rear walls push the side walls outwardly (i.e., spread them apart) and thus act as reinforcing brackets for the side walls 15. FIGS. 11 and 12 depict the safeties for the inserted side walls 15. Extending across the upper closure of the slots 17.1 is a projection 17.2 which prevents the front or rear wall 16, 16' from being pulled out unintentionally, and therefore, the walls 16, 16' continuously push the side walls 15 outwardly when used according to instructions. As the front or rear wall is pushed into the slots 17.1, the walls 15 are cammed outwardly, i.e., are spread apart so the projections 17.2 are moved out of obstructing relationship with the rear (and front) wall, enabling it to be inserted. Later, by manually spreading the side walls apart, the front and rear walls can be removed.

In lieu of nose 14.1, a cotter pin could be provided in FIGS. 8–10, similar to the cotter pin 3.6 described earlier in connection with FIGS. 7A, 7B.

Figure 13:
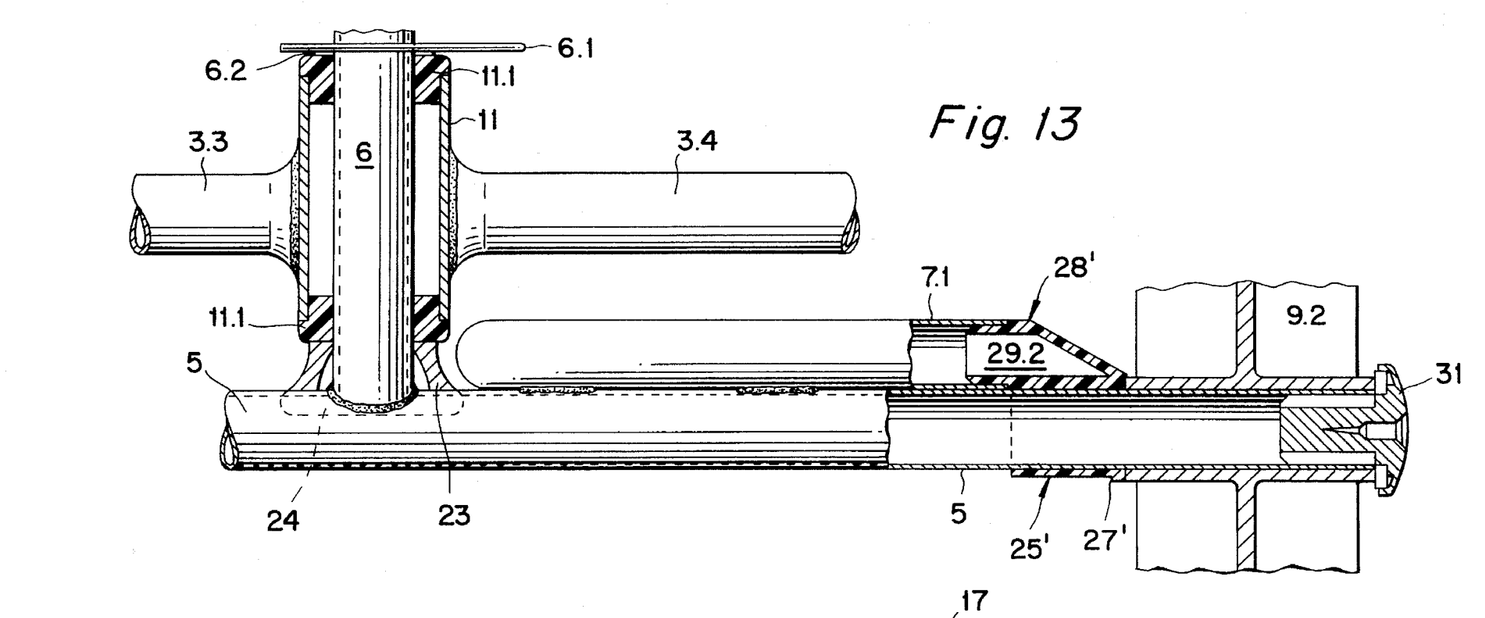
FIG. 13 is a sectional view through a portion of the front axle.

FIG. 13 depicts the front axle 5 (only one side thereof being illustrated) onto which is mounted a bearing bracket 25' for the front wheel 9.2. Also mounted on the axle 5 is a spacer sleeve 23. That sleeve has a portion 24 affixed to the axle 5. Mounted on the journal 6 is a fitting insert 11.1 which bears against spacer sleeve 23. Mounted on an upper end of the journal 6 is another fitting insert 11.1 seated on the upper side of the bearing tube 11. The previously described pin 6.1 prevents the journal from falling out, and the disk 6.2 prevents the pin from contacting the tube 11. The bearing bracket 25' (illustrated as a sectional side view) defines the mounting distance of the wheel 9.2, which is held and mounted externally with a mounting element 31. In so doing, the hub sleeve of the wheel 9.2 bears against a contact collar 27' of the bearing support bracket 25', so that the wheel runs smoother. To fix the position of the bearing bracket 25', and to prevent it from rotating, a locking nose 28' of the bearing bracket 25' includes a stopper 29.2 which fits into the end of the adjacent tube piece 7.1. Also, there is now no risk of injury caused by the exposed sharp edges.

Figures 14, 15, 16, 17:
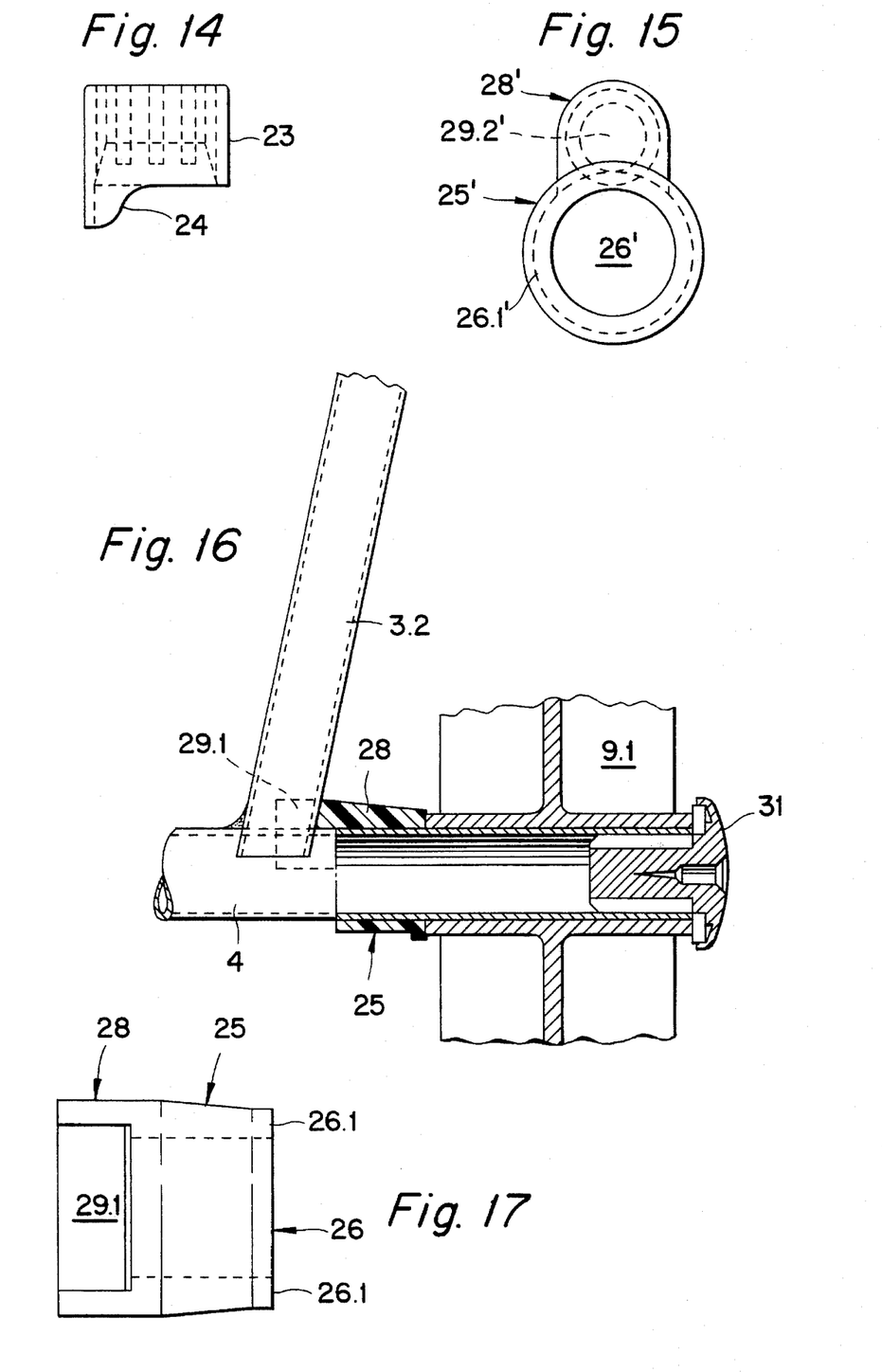
FIG. 14 is a side view of a bearing bracket for the front wheel bearing.
FIG. 15 is an end view of FIG. 14.
FIG. 16 is a sectional view through a portion of a rear axle.
FIG. 17 is a rear view of a bearing bracket for a rear wheel depicted in FIG. 16.

FIG. 14 is a side view of the spacing sleeve 23, which shows the collar-like extension 24, which engages against the front axle 5 and, the sleeve 23 and front axle rotate simultaneously. When the center pole is swivelled, the spacing sleeve 23 and the bottom fitting insert 11.1 also rotate. Both members 11.1 are made in an advantageous manner of plastic, whereby the plastics are chosen in such a manner that ease of motion is obtained. Member 23 can be of metal or plastic.

FIG. 15 is a side view of the front wheel bearing bracket 25' which includes an axle receptacle hole, 26 and an end surface 26.1 of the bearing collar 27, whereby the locking nose 28' is molded of one piece with the body of the bearing bracket 25'.

FIG. 16 shows one side of a rear axle 4 having a bearing bracket 25 for the rear wheel 9.1 The free axle journal of the rear axle 5 connected to the support 3.2 supports a rear wheel 9.1, whose hub (not illustrated in detail) rests against the collar 26.1 of the bearing bracket 25 and thus can run with low friction and low wear. This low friction and low wear requires that the bearing bracket 25 be fixed against rotating. To this end, a locking nose 28 is provided with a U-shaped extension 29.1, which standing on the rear axle at a certain angle (as indicated by the dashed line) envelops the support 3.2 in the shape of a U. FIG. 17 is a top view of this bearing bracket 25. Shown is the U-shaped extension 29.1, under which the body of the bearing bracket 25 is located whose interior is designed as a cylindrical axle receptacle 26.

Figure 18:
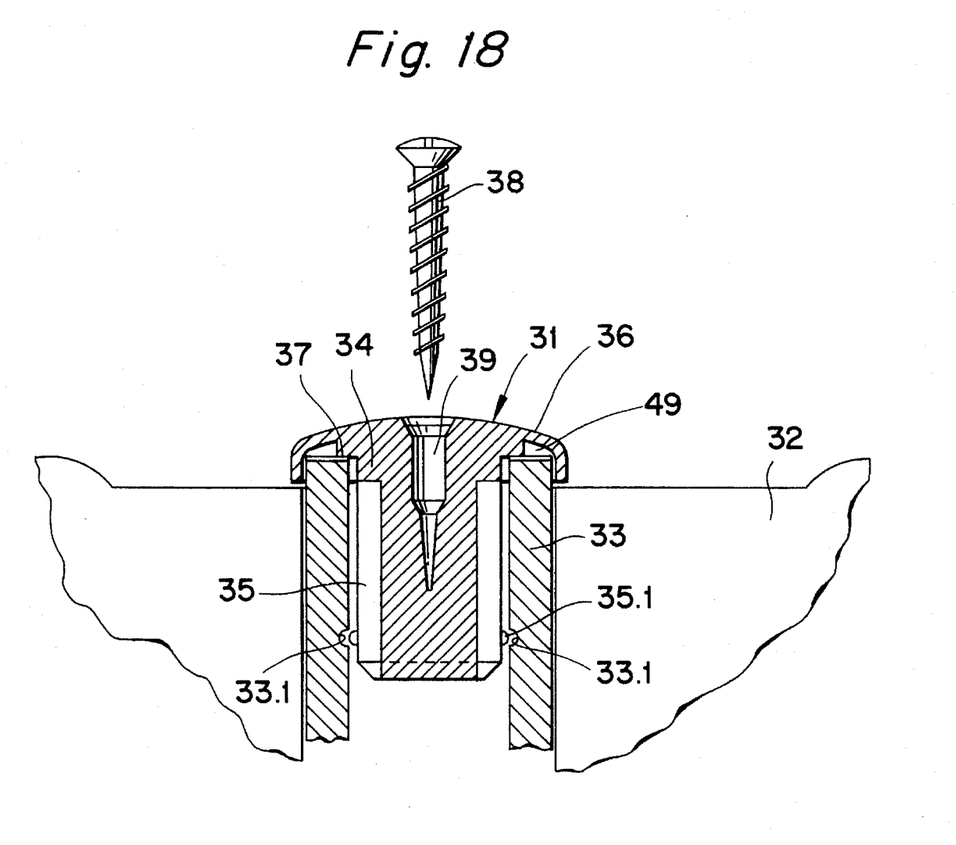
FIG. 18 is a sectional view through a wheel-locking device.
Figure 19:
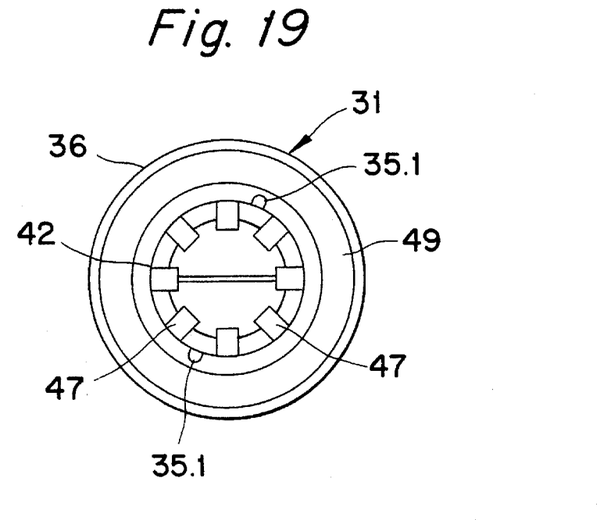
FIG. 19 is an end view of the mounting element as viewed in a direction toward the spreading element.

The mounting element 31 shown in FIGS. 18 and 19 for a rolling or slide mounted wheel 32 is attached to a tubular axle 33 of a hand wagon or a cart (not illustrated in detail). The mounting element 31 consists of a one-piece molding 34, which comprises a spreading element 35 and a cap 36 molded thereto. The spreading element 35 is inserted into the tube opening 37 of the axle 34, whereby the attached cap 36 rests against the edge of the tube opening 37 of the axle 33. The spreading element 35 can be expanded (clamped) against the inner wall of the axle tube 33 by means of a tightening screw 38. To accommodate the screw 38, an axial borehole 39 extends in the mounting element 31. To expand the spreading element 35, the screw is screwed into the molding 34. The borehole 39 extends slightly conically in the axial direction, so that, for the purpose of expansion, the screw screws into the body of the spreading element 35. A locking nub 35.1, provided on the outside of the spreading element, snaps into a corresponding recess, e.g. an annular groove 33.1 formed in the axle 33 and prevents the wheel from being pulled out unintentionally.

Figure 20:
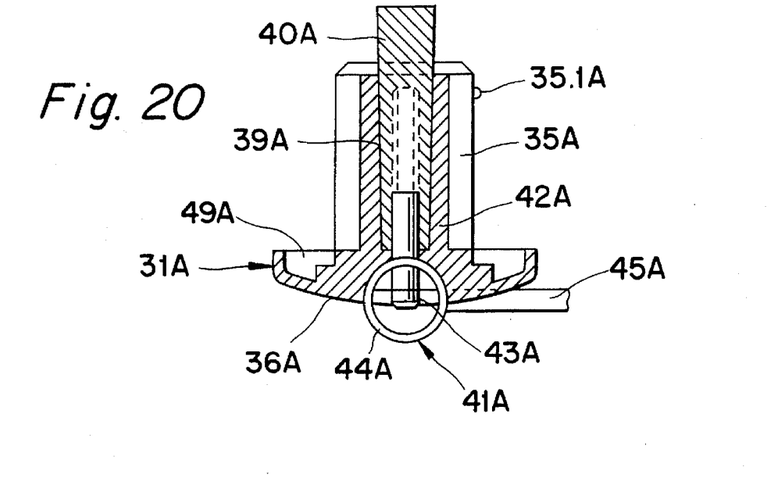
FIG. 20 is a sectional view of an alternative mounting element having a clamping wedge.
Figure 21:
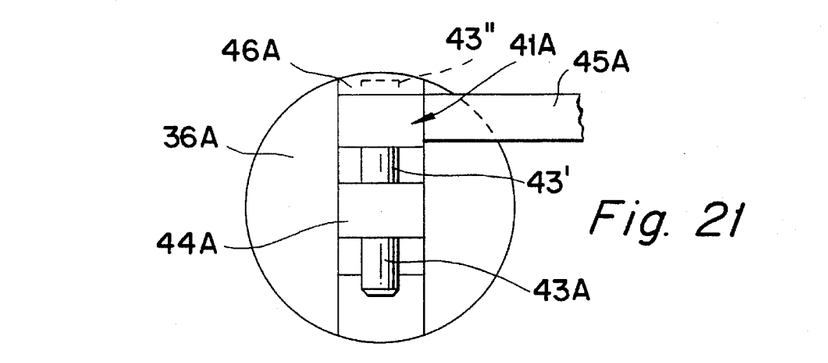
FIG. 21 is an end view of the cap of the mounting element according to FIG. 20.
Figure 22:
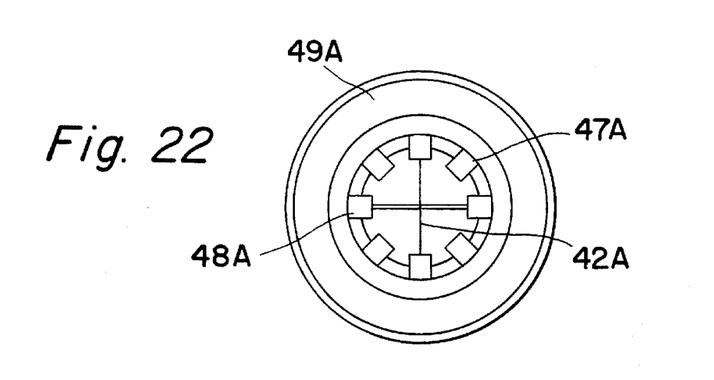
FIG. 22 is an end view of the mounting element according to FIG. 20 as viewed in a direction toward the spreading element.

As is evident from FIGS. 20–22, in an alternative mounting element 31A the expansion forces are generated by means of a clamping wedge 40A which can be slid into the borehole 39A. To introduce the clamping force, the clamping wedge 40A can be slid into the borehole 39A via an eccentric drive mechanism 41A mounted in the cap 36A for the purpose of transferring the expansion forces. The eccentric drive mechanism 41A comprises a bolt 43A, which extends at right angles to the tip 42A of the wedge and is connected directly to the "wedge tip 42A. The wedge 40A is arranged eccentrically in a pivot-mounted sleeve 44A. The sleeve 44A has a pin 43' rotatably mounted in a suitable bearing hole 43". A lever 45A, by which the sleeve 44A can be pivoted, is connected to the pin 43'. The bolt 43A and the receiving sleeve 44A and the lever 45A are embedded in the recess 46A of the cap 36A, so that in particular the eccentric gearing 41A projects just a little beyond the arched region of the cap 36A. By rotating the lever 45A in a direction drawing the wedge 40A into the borehole 39A to expand the expandable portion.

As shown in FIGS. 19 and 22, the spreading element 35 (and 35A) exhibits radial grooves 47 (and 47A) with slotted openings 48 (and 48A) in the bottom region. The arrangement of the radial grooves 47, 47A with respect tot he slotted openings 48, 48A facilitates in an advantageous manner the expansion work to be generated, since the deformation does not have to extend over the full body but rather only at the legs of the spreading element 35, 35A, the legs being formed by the grooves 47, 47A to obtain as snug and tight a fit as possible of the cap 36A on the face of the axle tube 33, a circumferential groove 49, 49A is formed on the inside of the arched cap 36, 36A. The circumferential groove 49, 49A corresponds to the wall thickness of the tubularly designed axle 33, so that a smaller end region of the tubular axle 33 is sheathed by the cap 36, 36A. Owing to this groove, 49A not only is the goal achieved that the cap 36, 36A rests snugly against the tube opening 37, but also that the tube opening 37 is sealed, so that in particular the cavity of the tube axle 33 is protected against penetrating water or moisture. For a simple and inexpensive production, the molding 34 is produced, for example, as a plastic injection molded part, which also allows the spreading element 35, 35A to be deformed, as required for the clamping operation."

Figure 23:
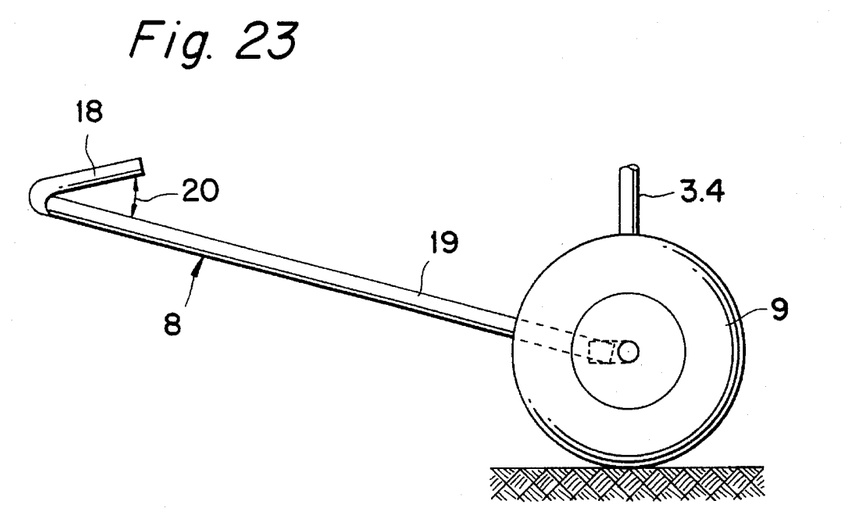
FIG. 23 is a schematic side view of the center pole.
Figure 24:
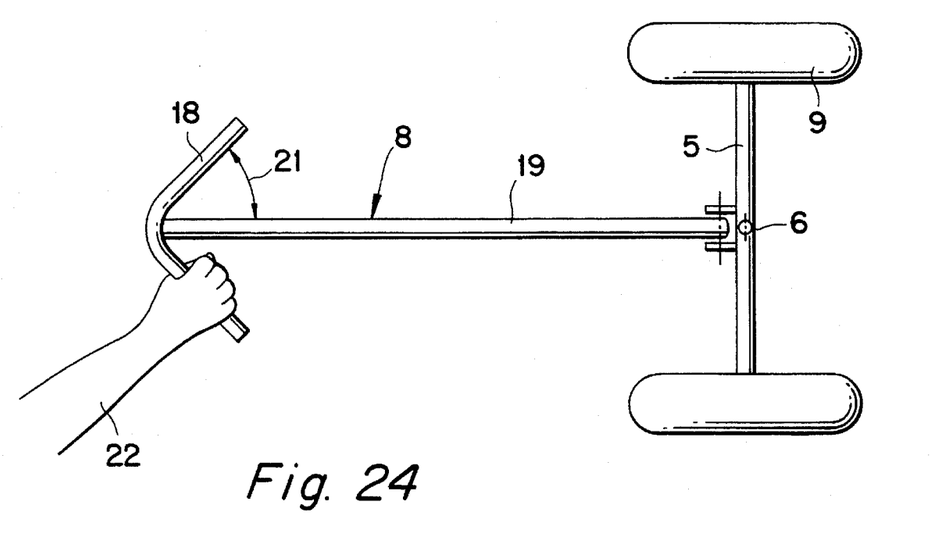
FIG. 24 is a top plan view of the center pole of the hand wagon with corresponding arm posture.

FIGS. 23 and 24 show the center pole 8 provided for the hand wagon 1. The center pole 8 exhibits at its front end a bent handle bar 18, which with respect to the angular positions relative to the pull rod 19 of the center pole 8 corresponds approximately to the unloaded hand position 22 of the human, as shown in detail in FIG. 24. The angled handle bars 18 are inclined upwardly at an angle 20 relative to the pull rod 19 as, viewed in a horizontal direction, so that their ends lie above the pull rod ends. The angle 20 ranges from 2° to 10° as shown in FIG. 23. Also, the handle bars extend at angle 21 relative to the pull rod 19 of less than 90°, whereby the angle 21 ranges preferably from 35° to 55° when seen in the vertical direction. The handle bars 18 form a semi-arrow-like hook and are swept-back. Rubber gripping elements can be slid onto the handle bars. The ergonomically efficient design of the handle bars 18 enables the hand wagon 1 to be pulled by a human 22, whose wrist is neither twisted nor angled while pulling the hand wagon 1, so that the pull force is introduced into the user's shoulder in accordance with the natural posture of the arm 22, and thus dragging and twisting forces are eliminated while the hand wagon is being pulled.

It will be appreciated by those skilled in the art that additions, deletions, modifications, and substitutions not specifically described may be made without departing from the spirit and scope of the invention as defined in the appended claims.

What is claimed is:

1. A manually transportable wagon comprising:
   a support portion including a support surface for supporting material being transported;
   a front axle supporting structure disposed adjacent a front region of said support portion and including a pair of front support sleeves connected to and extending downwardly from said support portion on opposite side thereof;
   a rear axle supporting structure disposed adjacent a rear region of said support portion and including a pair of rear support sleeves connected to and extending downwardly from said support portion on opposite sides thereof;
   each of said front and rear support sleeves being hollow at least at its upper portion to form a recess which is open at an upper end of a respective support sleeve;
   front and rear axles disposed beneath said support portion and carrying wheels, said rear axle being affixed to said rear axle-support structure, said front axle being connected to said front axle-support structure for rotation relative thereto about a vertical axis; and
   a pair of side walls including downwardly projection insert portions removably received in said recesses of respective ones of said front and rear support sleeves.

2. The wagon according to claim 1, wherein said support portion comprises a rectangular frame as viewed from above, and a support bed lying on said frame, said support bed forming said support surface, said front and rear support sleeves being affixed to said frame and projecting above said frame by a distance substantially equal to a thickness of said support bed.

3. The wagon according to claim 1, wherein lower ends of said rear support sleeves are affixed directly to said rear axle.

4. The wagon according to claim 1, wherein said front axle-support structure includes a horizontal portion connecting said front support sleeves to a vertical tube to which said front axle is rotatably mounted.

5. The wagon according to claim 1, wherein said recesses of said rear support sleeves are of rectangular cross-section; and said recesses of said front support sleeves are of round cross-section.

6. The wagon according to claim 1, wherein said insert portions are downwardly tapered when received in said recesses.

7. The wagon according to claim 1, wherein said insert portions carry lateral projections removably received in openings formed in said support sleeves to resist accidental removal of said insert portions.

8. The wagon according to claim 7, wherein said support sleeves include slots disposed adjacent said projections so that said projections can be elastically retracted from said openings.

9. The wagon according to claim 1, wherein each side wall includes front and rear upright slots, there being provided front and rear walls, said front wall including opposite end edges insertable downwardly into said front slots, and said rear wall including opposite end edges insertable downwardly into said rear slots.

10. The wagon according to claim 9, wherein each of said side walls is inclined upwardly and outwardly at a first angle, said first angle taken from said support portion outwardly towards the inclined side wall and each of said end edges of said front and rear walls is inclined upwardly and outwardly at a second angle, said second angle, said second angle taken from the support portion outwardly towards said edges in the same plane as the first angle being larger than said first angle.

11. The wagon according to claim 10, wherein said upright slots include projections at their upper ends for overlying said rear and front walls to resist accidental removal of said rear and front walls.

12. The wagon according to claim 1 including plastic bearing brackets mounted non-rotatably at outer ends of said front and rear axles, said wheels bearing axially against respective ones of said bearing brackets.

13. The wagon according to claim 12, wherein said bearing brackets mounted on said rear axle include portions engageable with respective ones of said rear support sleeves for preventing rotation of said bearing brackets.

14. The wagon according to claim 12 including tubes mounted on said front axle, and a pull rod attached to said tubes, each of said bearing brackets mounted on said front axle including a plug portion inserted into one of said tubes for preventing rotation of said bearing brackets.

15. The wagon according to claim 1 including a locking member for locking each wheel to its respective axle, said locking member extending axially through said wheel and into an end of said axle, an expandable portion of said member disposed in said axle being radially expandable against an inner wall of said axle by means of a spreader element insertable axially thereinto.

16. The wagon according to claim 15, wherein said spreader element comprises a screw.

17. The wagon according to claim 15, wherein said spreader element comprises an axially slidable wedge.

18. The wagon according to claim 15, wherein said expandable portion includes grooves extending axially along its outer periphery, and slits extending into a free end thereof.

19. The wagon according to claim 15, wherein said locking member includes an end cap covering an end of said axle, said end cap including a circumferential rim encompassing said axle, and a circumferential groove disposed radially inwardly of said rim, a portion of said end cap disposed radially inwardly of said groove bearing axially against said axle.

20. The wagon according to claim 15, wherein an outer periphery of said expandable portion carries a locking nub engageable in a recess formed in a wall of said axle.

21. The wagon according to claim 15, wherein said locking member is formed of plastic.

22. The wagon according to claim 1 including a vertical tube affixed to said front axle supporting structure, said front axle carrying a vertical journal rotatably disposed in said tube, a pair of fitting inserts disposed in upper and lower ends of said tube, said journal extending through said fitting inserts, said fitting inserts being rotatable relative to said tube.

23. The wagon according to claim 22 further including a spacing sleeve disposed on a lower end of said journal, a lower end of said spacing sleeve bearing against said front axle, an upper end of said spacer sleeve bearing against a lower end of said lower fitting insert.

24. A wagon according to claim 1 further including a pull bar for enabling a user to pull the wagon, said pull bar including a longitudinally extending portion and laterally outwardly extending handle bars situated at a front end of said longitudinally extending portion, each handle bar extending rearwardly and extending upwardly at a first angle of from 2 to 10 degrees with respect to a horizontal plane through said longitudinally extending portion, and extending rearwardly and extending outwardly at a second angle less than 90 degrees with respect to a vertical plane through said longitudinally extending portion.

25. The wagon according to claim 24, wherein said second angle is from 65 to 85 degrees.

26. The wagon according to claim 24 including elastomeric gripping elements mounted on said handle bars.

27. A manually transportable wagon, comprising:

a support portion including a horizontal support surface;

front and rear ground support wheels carried by said support portion, front support wheels mounted at the end of a front axle which is rotatable about a vertical axis; and a pull bar attached to said front axle and projecting forwardly therefrom, said pull bar comprising a longitudinally extending portion and laterally outwardly extending handle bars situated at a front end of said longitudinally extending portion, each handle bar extending rearwardly and extending upwardly at a first angle of from 2 to 10 degrees with respect to a horizontal plane through said longitudinally extending portion, and extending rearwardly and extending outwardly at a second angle less than 90 degrees with respect to a vertical plane through said longitudinally extending portion.

* * * * *